US012650084B1

(12) United States Patent
Sato et al.

(10) Patent No.: US 12,650,084 B1
(45) Date of Patent: Jun. 9, 2026

(54) STEAM TURBINE ROTOR AND STEAM TURBINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Masaki Sato, Yokohama (JP); Ryuichi Ishii, Tokyo (JP); Hironori Nabeshima, Kawasaki (JP); Kenji Nagayama, Yokohama (JP); Kazuya Shirato, Yokohama (JP); Yoshihiro Sato, Kawasaki (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 19/237,164

(22) Filed: Jun. 13, 2025

(30) Foreign Application Priority Data

Mar. 3, 2025 (JP) ................................ 2025-032999

(51) Int. Cl.
*F01D 11/08* (2006.01)

(52) U.S. Cl.
CPC .......... *F01D 11/08* (2013.01); *F05D 2220/31* (2013.01); *F05D 2240/24* (2013.01)

(58) Field of Classification Search
CPC ...... F01D 11/08; F01D 11/001; F01D 11/006; F05D 2220/31; F05D 2240/24
See application file for complete search history.

(56) References Cited

U.S. PATENT DOCUMENTS

| | | | | |
|---|---|---|---|---|
| 5,601,407 A * | 2/1997 | Humhauser | F01D 25/246 415/209.2 |
| 5,704,760 A * | 1/1998 | Bouchard | F16J 15/3288 415/230 |
| 6,318,728 B1 * | 11/2001 | Addis | F16J 15/3288 277/355 |
| 8,591,181 B2 * | 11/2013 | Kasibhotla | F01D 11/122 415/173.5 |
| 2003/0185700 A1 | 10/2003 | Ishii et al. | |

(Continued)

FOREIGN PATENT DOCUMENTS

| | | | |
|---|---|---|---|
| JP | 3819848 B2 | 9/2006 |
| JP | 2010-084835 A | 4/2010 |

(Continued)

OTHER PUBLICATIONS

JP Office Action for JP Appl. Ser. No. 2025-032999 dated Sep. 16, 2025 (23 pages).

*Primary Examiner* — Aaron R Eastman
(74) *Attorney, Agent, or Firm* — Foley & Lardner LLP

(57) ABSTRACT

A turbine rotor of an embodiment includes: a fixing groove formed in a circumferential direction in an outer peripheral surface; and a seal fin fixed by a fixing member in the fixing groove. The seal fin is constituted of a first seal fin divided structure, a second seal fin divided structure, and a third seal fin divided structure, in which it is divided into three in the circumferential direction, and a length in the circumferential direction of the third seal fin divided structure which is fixed in the fixing groove last is shorter than lengths in the circumferential direction of the others of the seal fin divided structures.

5 Claims, 4 Drawing Sheets

(56) References Cited

U.S. PATENT DOCUMENTS

| | | | | |
|---|---|---|---|---|
| 2008/0175706 | A1* | 7/2008 | Ikeda | F01D 5/3046 415/173.4 |
| 2009/0142187 | A1* | 6/2009 | Narita | F01D 11/08 415/173.1 |
| 2010/0278645 | A1* | 11/2010 | Narita | F01D 11/08 415/230 |
| 2011/0249931 | A1 | 10/2011 | Omoto et al. | |
| 2012/0243977 | A1* | 9/2012 | Simonet | F01D 11/02 415/173.3 |
| 2015/0300189 | A1* | 10/2015 | Janarthanan | F02C 7/28 277/347 |
| 2015/0361816 | A1* | 12/2015 | Aksit | F16J 15/3288 415/174.2 |
| 2016/0003360 | A1* | 1/2016 | Klaen | F16J 15/322 277/355 |
| 2016/0115825 | A1* | 4/2016 | Wilson | F01D 5/24 248/682 |
| 2020/0040733 | A1* | 2/2020 | Stanka | F01D 11/02 |
| 2020/0325784 | A1* | 10/2020 | Oikawa | F16J 15/3268 |
| 2022/0049627 | A1 | 2/2022 | Terada et al. | |

FOREIGN PATENT DOCUMENTS

| | | | |
|---|---|---|---|
| JP | 2014-009681 | A | 1/2014 |
| JP | 6712859 | B2 | 6/2020 |
| JP | 7211877 | B2 | 1/2023 |
| WO | WO-2020/067496 | A | 4/2020 |

* cited by examiner

STEAM TURBINE ROTOR AND STEAM TURBINE

CROSS REFERENCE TO RELATED APPLICATIONS

This application is based upon and claims the benefit of priority from Japanese Patent Application No. 2025-032999, filed on Mar. 3, 2025; the entire contents of which are incorporated herein by reference.

FIELD

Embodiments described herein relate generally a steam turbine rotor and a steam turbine.

BACKGROUND

A steam turbine mainly includes a casing, a turbine rotor penetrating the casing, a stator blade cascade composed of a plurality of stator blades provided in a circumferential direction of the turbine rotor, a rotor blade cascade composed of a plurality of rotor blades implanted in the circumferential direction in the turbine rotor, and a bearing rotatably supporting the turbine rotor.

A turbine stage of the steam turbine is constituted by the stator blade cascade and the rotor blade cascade on an immediately downstream side of this stator blade cascade. The steam turbine includes a plurality of the turbine stages in an axial direction of the turbine rotor.

Here, the downstream side means a side to which a main flow of a working fluid flows in a center axis direction of the turbine rotor. Note that the upstream side means an upstream side in a flow direction of the main flow of the working fluid in the center axis direction of the turbine rotor. The circumferential direction is a circumferential direction centered on a center axis of the turbine rotor, that is, a circumference around the center axis. Further, the center axis direction of the turbine rotor is simply referred to as an axial direction in the following.

A gap exists between a static structure such as the casing and the stator blade, and, a rotating structure such as the turbine rotor. Further, in order to prevent leakage of the working fluid from this gap, either one of the static structure and the rotating structure, or both the static structure and the rotating structure are provided with seal members. The seal member is provided over the circumferential direction of the turbine rotor. Further, a plurality of stages of the seal member are provided in the axial direction, and constitute a labyrinth seal structure. The narrower the gap between the static structure and the rotating structure is, the smaller a leakage amount of steam is, which yields excellent sealing performance.

In a seal part constituting this labyrinth seal structure, for example, a seal fin with an implanted structure is adopted as the seal member. The seal part includes a fixing groove formed over the circumferential direction in an outer peripheral surface of the turbine rotor, a seal fin mounted in this fixing groove, and a fixing member such as a caulking wire which fixes the seal fin in the fixing groove. Note that a plurality of the fixing grooves are formed at predetermined intervals in the axial direction in the outer peripheral surface of the turbine rotor.

The seal fin is constituted by processing a band-shaped metal thin sheet having a predetermined width. The seal fin is constituted by bending one end on a long side of the band-shaped metal thin sheet to shape its cross section into a letter L, and processing it into an arc shape in a longitudinal direction. The seal fin is disposed at a bottom portion of the fixing groove, and includes a base portion extending in a groove width direction of the fixing groove (axial direction), and a fin portion standing from one end side in the groove width direction of the base portion to an opening side of the fixing groove. The base portion is disposed to face a bottom surface of the fixing groove. The fin portion of the seal fin is configured to protrude outward from the fixing groove when the seal fin is mounted in the fixing groove.

Here, in incorporating the seal fin in the fixing groove, a twist may be produced when a length in the circumferential direction of the seal fin is long. In this case, the seal fin is inserted in the fixing groove while this twist is being eliminated, which requires time for assembling work. Further, when the length in the circumferential direction of the seal fin is long, an undulation which changes a shape of a surface of the fin portion into an uneven shape may be produced after the insertion in the fixing groove. This may prevent a clearance in the axial direction between the seal fins from becoming a set clearance after the assembly of the steam turbine.

Further, in replacing the seal fin placed between the stator blade and the turbine rotor in a state where the rotor blade is assembled, the component larger in outside diameter than the turbine rotor is present, so that the long length in the circumferential direction of the seal fin hinders the work.

Thus, conventionally, seal fins equally divided into two to four in the circumferential direction have been studied.

In incorporating the above divided seal fins (hereinafter, referred to as seal fin divided structures.) in the fixing groove, a predetermined circumferential clearance is required to be provided between the seal fin divided structure and the seal fin divided structure adjacent to this in consideration of thermal expansion of the seal fins and the turbine rotor at the time of operation of the steam turbine.

Normally, the incorporation of the seal fin into the fixing groove is performed by a worker. The seal fin is fixed by driving a caulking wire to caulk it into the fixing groove in which the seal fin has been incorporated. In caulking the caulking wire, the seal fin is plastic-deformed to extend in the circumferential direction, but an extension thereof is difficult to accurately calculate by calculation. Further, the longer the length in the circumferential direction of the seal fin is, the more difficult the calculation of the extension is.

When the conventional seal fin divided structures in which the seal fin is equally divided into two to four are used, the seal fin divided structure which has already been incorporated is plastic-deformed to extend in the circumferential direction, so that when the seal fin divided structure which is incorporated last is incorporated as it is, a predetermined circumferential clearance may fail to be obtained.

Further, as described above, the extension length in the circumferential direction of the seal fin is difficult to calculate beforehand, and thus the length in the circumferential direction of the seal fin divided structure is adjusted while the seal fin divided structure which is incorporated last is being fixed. In performing this adjustment, adjustment work of the length in the circumferential direction of the seal fin divided structure is required to be performed in a state where most of the seal fin divided structure which is incorporated last is fixed in the fixing groove by the caulking wire.

When the adjustment work is performed in this state, there is a risk of damaging the turbine rotor, the surrounding component, or the like by dropping of the seal fin and the caulking wire which have already been fixed in the fixing groove, or their contact with a tool for adjustment work. Thus, in incorporating the seal fin divided structure last, the work becomes complicated.

DETAILED DESCRIPTION

Hereinafter, embodiments of the present invention will be described in reference to the drawings.

In one embodiment, a turbine rotor includes: a fixing groove formed over a circumferential direction in an outer peripheral surface; and a seal fin having a base portion disposed on a bottom surface of the fixing groove and extending in a groove width direction of the fixing groove, and a fin portion standing from one end side in the groove width direction of the base portion to an opening side of the fixing groove, and fixed by a fixing member in the fixing groove.

Further, the seal fin is constituting by disposing a plurality of seal fin divided structures in the circumferential direction, and a length in the circumferential direction of the seal fin divided structure which is fixed in the fixing groove last is shorter than lengths in the circumferential direction of the others of the seal fin divided structures.

First Embodiment

Figure 1:
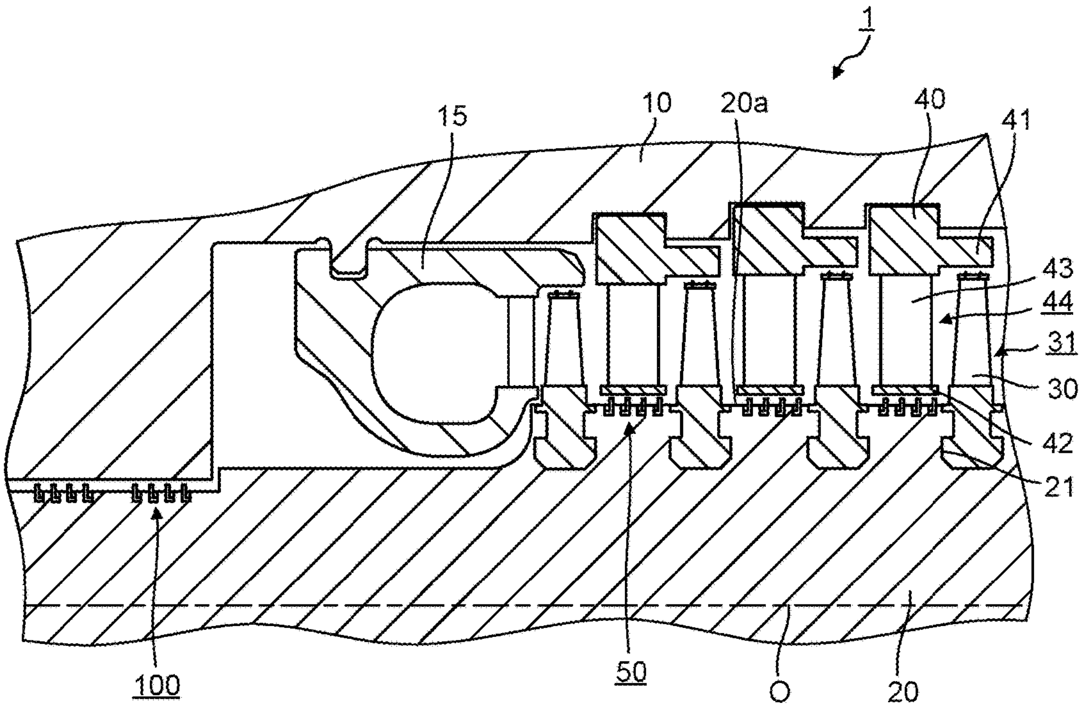
FIG. 1 is a view schematically illustrating a meridian cross section of a steam turbine including a turbine rotor of a first embodiment.

FIG. 1 is a view schematically illustrating a meridian cross section of a steam turbine 1 including a turbine rotor 20 of a first embodiment. Note that also in the embodiment, the respective meanings of an upstream side, a downstream side, an axial direction, and a circumferential direction are as previously described.

As illustrated in FIG. 1, the steam turbine 1 includes a casing 10, and a turbine rotor 20 penetratingly provided in the casing 10. Note that the turbine rotor 20 is rotatably supported by a not-illustrated rotor bearing.

The turbine rotor 20 includes a blade groove 21 formed over the circumferential direction of an outer peripheral surface 20*a*. A plurality of the blade grooves 21 are formed at predetermined intervals in the axial direction. A plurality of rotor blades 30 are implanted in the circumferential direction in the blade grooves 21. A rotor blade cascade 31 including the plurality of rotor blades 30 in the circumferential direction is constituted in a plurality of stages in the axial direction.

A diaphragm outer ring 40 is placed in an inner periphery of the casing 10. The diaphragm outer ring 40 has, for example, an annular extension portion 41 annularly extending to the downstream side and surrounding a periphery of the rotor blades 30. A diaphragm inner ring 42 is placed inside the diaphragm outer ring 40.

A plurality of stator blades 43 are disposed in the circumferential direction to constitute a stator blade cascade 44 between the diaphragm outer ring 40 and the diaphragm inner ring 42. The diaphragm outer ring 40 supports the stator blades 43 from a radially outer side, and the diaphragm inner ring 42 supports the stator blades 43 from a radially inner side.

Note that a radial direction is a direction perpendicular to a center axis O with the center axis O of the turbine rotor 20 set as a base point. The radially inner side is a side approaching the center axis O (center axis O side) in the radial direction. The radially outer side is a side separating from the center axis O of the turbine rotor 20 in the radial direction.

The stator blade cascade 44 is provided in a plurality of stages alternately with the rotor blade cascade 31 in the axial direction. Further, the stator blade cascade 44 and the rotor blade cascade 31 located on an immediately downstream side thereof constitute one turbine stage.

Between the turbine rotor 20 and the diaphragm inner ring 42, a seal part 50 is provided to prevent steam from leaking to the downstream side therebetween. That is, the seal part 50 is provided between the turbine rotor 20 and the diaphragm inner ring 42. Further, between the turbine rotor 20 and the casing 10, a gland seal part 100 is provided to prevent leakage of steam to the outside.

The seal part 50 and the gland seal part 100 are provided over the circumferential direction of the turbine rotor 20.

The turbine rotor 20 includes a seal structure for constituting the seal part 50 and the gland seal part 100. This seal structure which the turbine rotor 20 includes is described later. Note that the turbine rotor 20 including the seal structure functions as a rotating structure. Further, the diaphragm inner ring 42 (stator blade cascade 44) and the casing 10 constituting the seal part 50 and the gland seal part 100 with the seal structure of the turbine rotor 20 function as a static structure.

In the steam turbine 1 including the above configuration, the steam flowed into a nozzle box 15 through a not-illustrated steam introduction pipe performs expansion work while passing through the turbine stages to rotate the turbine rotor 20. Then, the steam which has performed the expansion work passes through an exhaust passage (not illustrated), and is exhausted to the outside of the steam turbine 1.

Here, the seal structure of the turbine rotor 20 constituting the seal part 50 and the gland seal part 100 is explained in detail. Note that the seal structure of the turbine rotor 20 constituting the seal part 50 is the same as the seal structure of the turbine rotor 20 constituting the gland seal part 100.

Figure 2:
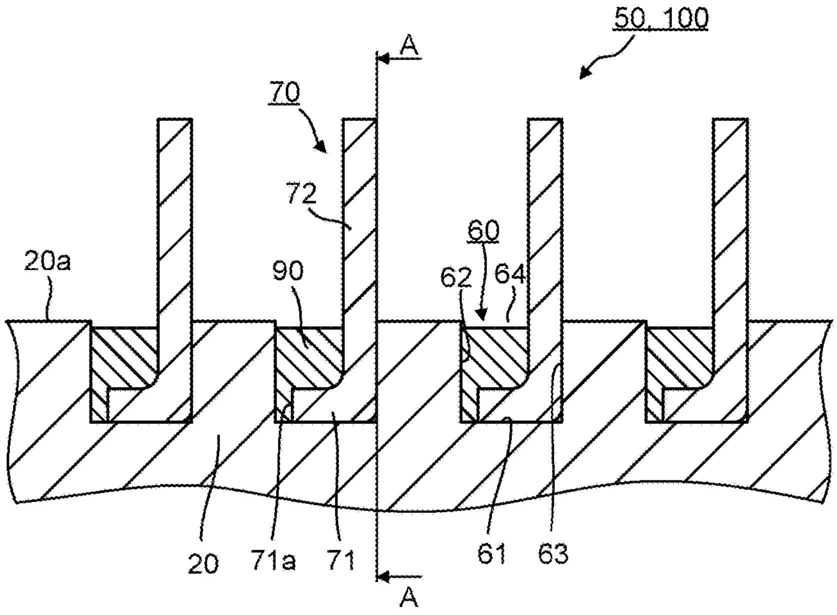
FIG. 2 is a view enlarging and illustrating a sectional view of a seal structure of the turbine rotor of the first embodiment illustrated in FIG. 1 in a seal part and a gland seal part.
Figure 3:
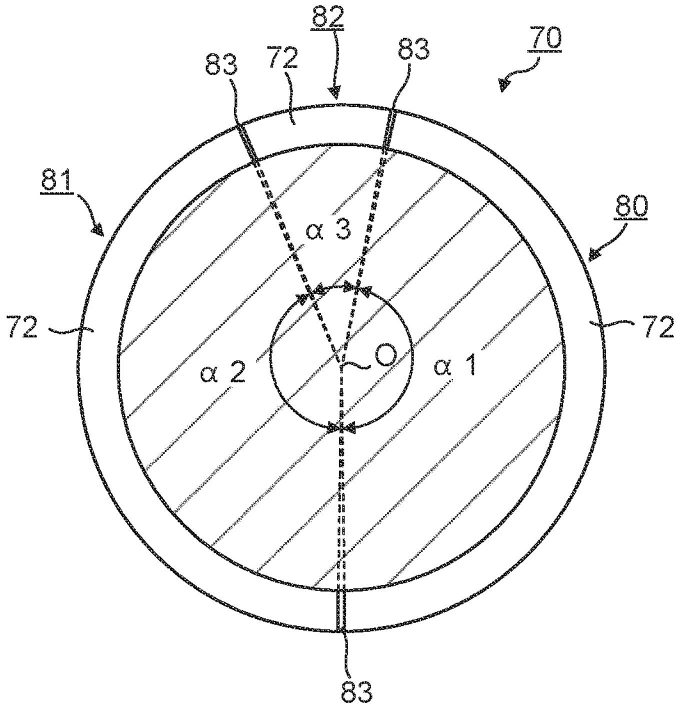
FIG. 3 is a view schematically illustrating an A-A cross section in FIG. 2.

FIG. 2 is a view enlarging and illustrating a sectional view of the seal structure of the turbine rotor 20 of the first embodiment illustrated in FIG. 1 in the seal part 50 and the gland seal part 100. FIG. 3 is a view schematically illustrating an A-A cross section in FIG. 2.

As illustrated in FIG. 2, the turbine rotor 20 includes a fixing groove 60, a seal fin 70, and a fixing member 90.

The fixing groove 60 is a groove for fixing the seal fin 70. The fixing groove 60 is constituted by an annular groove formed over the circumferential direction in the outer peripheral surface **20*a* of the turbine rotor 20. A plurality of the fixing grooves 60 are formed at predetermined intervals in the axial direction in the outer peripheral surface 20*a* of the turbine rotor 20**. Here, one example of having four grooves in the axial direction is shown.

The fixing groove 60 is defined by a bottom surface 61 parallel to the axial direction, and inner surfaces 62, 63 extending from both ends in the axial direction of the bottom surface 61 toward the radially outer side, as illustrated in FIG. 2. The inner surface 62 and the inner surface 63 constitute facing surfaces facing each other.

The seal fin 70 has an L-shaped cross section in the cross section illustrated in FIG. 2. The seal fin 70 is curved in an arc shape in a longitudinal direction (circumferential direction), and has a ring shape as a whole. The seal fin 70 has a base portion 71 and a fin portion 72.

The base portion 71 is disposed on the bottom surface 61 of the fixing groove 60 in mounting the seal fin 70 in the fixing groove 60, and extends in a groove width direction (axial direction) of the fixing groove 60.

The fin portion 72 stands from one end side in the groove width direction of the base portion 71 (axial direction) to an opening 64 side of the fixing groove 60 (radially outer side). In other words, the fin portion 72 stands from one side of end portions facing toward the groove width direction of the base portion 71 (axial direction) to the opening 64 side of the fixing groove 60 (radially outer side).

Here, in FIG. 2, there is shown one example in which the fin portion 72 is mounted to come in contact with the inner surface 63 on the downstream side of the fixing groove 60. In this case, a tip portion **71*a* of the base portion 71 faces toward the upstream side. Note that the fin portion 72 may be mounted to come in contact with the inner surface 62 on the upstream side. In this case, the tip portion 71*a* of the base portion 71** faces toward the downstream side.

For example, the base portion 71 is configured to be slightly shorter than a groove width of the fixing groove 60 (width in the axial direction) in consideration of allowing the base portion 71 to be easily inserted in the fixing groove 60, or the like. The fin portion 72 protrudes from the outer peripheral surface **20*a* of the turbine rotor 20 to the radially outer side to suppress a flow of a working fluid (steam). Note that the fin portion 72 protrudes to the diaphragm inner ring 42 side in the seal part 50. The fin portion 72 protrudes to the casing 10 side in the gland seal part 100**.

Note that a tip portion of the fin portion 72 illustrated in FIG. 2 may be formed in a tapered shape whose thickness gradually decreases toward the tip. Further, the seal fin 70 is constituted by bending a band-shaped metal thin sheet having a predetermined width, for example.

The seal fin 70 is constituted by disposing a plurality of seal fin divided structures in the circumferential direction. Specifically, the seal fin 70 is constituted of a first seal fin divided structure 80, a second seal fin divided structure 81, and a third seal fin divided structure 82, in which it is divided into three over the circumferential direction, as illustrated in FIG. 3. That is, the seal fin 70 is constituted by disposing the three of the seal fin divided structures in the circumferential direction.

Here, each of the first seal fin divided structure 80, the second seal fin divided structure 81, and the third seal fin divided structure 82 has the L-shaped cross section, and has the base portion 71 and the fin portion 72 as explained as the shape of the seal fin 70 in the above. Each of the first seal fin divided structure 80, the second seal fin divided structure 81, and the third seal fin divided structure 82 is curved in the arc shape in the longitudinal direction (circumferential direction).

The seal fin 70 in a ring shape is constituted as a whole by disposing the seal fin divided structures 80, 81, 82 in the circumferential direction in the fixing groove 60. Clearances 83 with a predetermined width are provided between the seal fin divided structures 80, 81, 82 adjacent in the circumferential direction in consideration of thermal expansion of the seal fin and the turbine rotor at the time of operation of the steam turbine. The predetermined width of the clearances 83 is set to, for example, about 0.5 mm to 2 mm. Note that the clearances 83 are almost eliminated by the thermal expansion of the seal fin and the turbine rotor at the time of operation of the steam turbine. That is, the clearances 83 are set to become almost zero at the time of operation of the steam turbine.

A length in the circumferential direction (longitudinal direction) of the third seal fin divided structure 82 is shorter than lengths in the circumferential direction of the first seal fin divided structure 80 and the second seal fin divided structure 81. That is, the length in the circumferential direction of the third seal fin divided structure 82 is the shortest of those of the seal fin divided structures 80, 81, 82.

Further, the third seal fin divided structure 82 is fixed in the fixing groove 60 last. In other words, the length in the circumferential direction of the third seal fin divided structure 82 which is fixed last is configured to be the shortest.

Further, here, a case where the length in the circumferential direction of the first seal fin divided structure 80 is longer than the length in the circumferential direction of the second seal fin divided structure 81 is exemplified. That is, the length in the circumferential direction of the first seal fin divided structure 80 is the longest of those of the seal fin divided structures 80, 81, 82. Note that the length in the circumferential direction of the first seal fin divided structure 80 may be configured to be equal to the length in the circumferential direction of the second seal fin divided structure 81.

Here, a division angle $\alpha 1$ centered on the center axis O in the first seal fin divided structure 80 having the longest length in the circumferential direction is set to 180 degrees or less in a cross section perpendicular to the center axis O of the turbine rotor 20 illustrated in FIG. 3. A twist of the first seal fin divided structure 80 is suppressed in incorporating the first seal fin divided structure 80 in the fixing groove 60 by setting the division angle $\alpha 1$ to 180 degrees or less. Further, an undulation to be produced on a surface of the fin portion 72 is suppressed by setting the division angle $\alpha 1$ to 180 degrees or less.

Note that a division angle $\alpha 2$ in the second seal fin divided structure 81 is smaller than the division angle $\alpha 1$, and larger than a division angle $\alpha 3$. When the length in the circumferential direction in the first seal fin divided structure 80 is equal to the length in the circumferential direction in the second seal fin divided structure 81, the division angle $\alpha 1$ is equal to the division angle $\alpha 2$.

Here, the length in the circumferential direction of the third seal fin divided structure 82 having the shortest length in the circumferential direction is set to not less than 30 mm nor more than 200 mm. Further, the length in the circumferential direction of the third seal fin divided structure 82 is more preferably set to not less than 50 mm nor more than 150 mm.

When the length in the circumferential direction of the third seal fin divided structure 82 is less than 30 mm, in caulking the fixing member 90 for fixing the third seal fin divided structure 82, the third seal fin divided structure 82 comes close to the first seal fin divided structure 80 and the second seal fin divided structure 81 which have already been fixed, so that the fixing member 90 fixing the first seal fin divided structure 80 and the second seal fin divided structure 81 is also caulked at the same time. This causes the clearances 83 between the third seal fin divided structure 82 and the first seal fin divided structure 80 adjacent to this and between the third seal fin divided structure 82 and the second seal fin divided structure 81 adjacent to this to become narrow.

Further, when the length in the circumferential direction of the third seal fin divided structure 82 is less than 30 mm, a proper grip allowance for fixing it to a jig (a section where it is fixed to the jig) cannot be obtained in performing processing for adjusting the length of the third seal fin divided structure 82.

Here, in caulking the fixing member 90, the seal fin 70 extends in the circumferential direction, but an extension thereof is difficult to accurately calculate by calculation. Further, the longer the length in the circumferential direction of the seal fin 70 is, the more difficult the calculation of the extension is. When the length in the circumferential direction of the third seal fin divided structure 82 exceeds 200 mm, an extension in the circumferential direction of the third seal fin divided structure 82 also increases in caulking the fixing member 90. Therefore, in fixing the third seal fin divided structure 82 with the length exceeding 200 mm, an extension length in the circumferential direction cannot be accurately estimated, so that the clearances 83 with the predetermined width between the third seal fin divided structure 82 and the first seal fin divided structure 80 which has already been fixed and between the third seal fin divided structure 82 and the second seal fin divided structure 81 which has already been fixed are difficult to maintain.

For example, in fixing the third seal fin divided structure 82 whose length in the circumferential direction exceeds 200 mm, an end portion of the third seal fin divided structure 82 may overlap with the first seal fin divided structure 80 or the second seal fin divided structure 81 which has already been fixed. In such a case, length adjustment processing of the end portion of the third seal fin divided structure 82 is performed in a state in the course of fixing work, or the third seal fin divided structure 82 is removed and the length adjustment processing of the end portion is performed. A complicated processing process is required in either of the processes.

Here, the above range of the length in the circumferential direction in the third seal fin divided structure 82 is appropriately set based on a rotor diameter of the turbine rotor 20. For example, when the turbine rotor 20 has a large rotor diameter, the length in the circumferential direction of the third seal fin divided structure 82 can be set to be long. On the other hand, when the turbine rotor 20 has a small rotor diameter, the length in the circumferential direction of the third seal fin divided structure 82 is set to be short.

For example, the third seal fin divided structure 82 with the maximum length (200 mm) in the circumferential direction is used for the turbine rotor 20 having a rotor diameter such that the division angle $\alpha 3$ regarding the third seal fin divided structure 82 illustrated in FIG. 3 becomes 100 degrees or less.

The fixing member 90 fixes the seal fin 70 (the first seal fin divided structure 80, the second seal fin divided structure 81, and the third seal fin divided structure 82) in the fixing groove 60. The fixing member 90 is constituted by a caulking wire or the like.

The fixing member 90 is plastic-deformed to be caulked by being driven into the fixing groove 60 in which the seal fin 70 has been disposed, thereby fixing the seal fin 70. The fixing member 90 is caulked, thereby being plastic-deformed to expand in the fixing groove 60 including a gap between the base portion 71 and the inner surface 62 to fix the seal fin 70.

The fixing member 90 is adjusted to a length corresponding to the lengths in the circumferential direction of the seal fin divided structures 80, 81, 82 which are fixed, for example. For example, the three of the fixing members 90 corresponding to the lengths in the circumferential direction of the seal fin divided structures 80, 81, 82 are used for the three of the seal fin divided structures 80, 81, 82.

Next, a fixing method of the seal fin 70 will be explained.

Here, as described above, the fixing method of seal fin 70 is explained by exemplifying the case where the seal fin 70 is divided into three. The third seal fin divided structure 82 having the shortest length in the circumferential direction is fixed last.

Note that either the first seal fin divided structure 80 or the second seal fin divided structure 81 may be fixed first. Here, the fixation is performed from the first seal fin divided structure 80 having the longest length in the circumferential direction.

The first seal fin divided structure 80 is inserted in the fixing groove 60 in a position of facing the fin portion 72 toward the radially outer side and facing the end portion of the base portion 71 toward the upstream side. Further, the first seal fin divided structure 80 is mounted in the fixing groove 60 with the base portion 71 brought into contact with the bottom surface 61 of the fixing groove 60, and with the fin portion 72 brought into contact with the inner surface 63 of the fixing groove 60.

Subsequently, the first seal fin divided structure 80 is fixed in the fixing groove 60 by driving the fixing member 90 between the fixing groove 60 and the first seal fin divided structure 80 to plastic-deform it.

Subsequently, the second seal fin divided structure 81 is mounted in the fixing groove 60 by a method similar to the above mounting method of the first seal fin divided structure 80 to the fixing groove 60. At this time, the second seal fin divided structure 81 is mounted adjacently to the first seal fin divided structure 80 so that the clearance 83 with a predetermined width can be obtained between the second fin divided structure 81 and the first seal fin divided structure 80 adjacent thereto after fixing the second seal fin divided structure 81.

Then, the second seal fin divided structure 81 is fixed in the fixing groove 60 by a method similar to the above fixing method of the first seal fin divided structure 80.

Subsequently, the third seal fin divided structure 82 having the shortest length in the circumferential direction is mounted in the fixing groove 60 by a method similar to the above mounting method of the first seal fin divided structure 80 to the fixing groove 60. The third seal fin divided structure 82 is mounted between the first seal fin divided structure 80 and the second seal fin divided structure 81 which have already been fixed.

At this time, based on a length in the circumferential direction of the fixing groove 60 between the first seal fin divided structure 80 and the second seal fin divided structure 81, the length in the circumferential direction of the third seal fin divided structure 82 is subjected to adjustment processing so that the clearances 83 with the predetermined width can be obtained between the third seal fin divided structure 82 and the first seal fin divided structure 80 adjacent thereto and between the third seal fin divided structure 82 and the second seal fin divided structure 81 adjacent thereto after fixing the second seal fin divided structure 81. The third seal fin divided structure 82 in which the length in the circumferential direction has been subjected to adjustment processing is mounted between the first seal fin divided structure 80 and the second seal fin divided structure 81 which have already been fixed.

Subsequently, the third seal fin divided structure 82 is fixed in the fixing groove 60 by a method similar to the above fixing method of the first seal fin divided structure 80.

Here, materials composing the turbine rotor 20, the seal fin 70, and the fixing member 90 will be explained.

For the turbine rotor 20, CrMoV steel, 12Cr steel, or the like is used based on a temperature, a pressure, and the like of steam which is a working fluid in the steam turbine 1.

The seal fin 70 (the first seal fin divided structure 80, the second seal fin divided structure 81, the third seal fin divided structure 82) requires high-temperature strength because a force is applied in a flow direction of steam.

Further, at the time of operation of the steam turbine 1, a temperature of the turbine rotor 20 rises to, for example, about 600° C., so that the rotor diameter is extended by thermal expansion. Moreover, the turbine rotor 20 rotates at high speed, so that the rotor diameter is further extended by a centrifugal force. At the time of operation of the steam turbine 1, the clearances 83 in the circumferential direction between the seal fin divided structures 80, 81, 82 extend more as compared with a time of room temperature assembly. When the clearance 83 in the circumferential direction extends, steam leaks from the clearance 83. Thus, in order to suppress the extension of the clearance 83 at the time of operation of the steam turbine 1, the seal fin 70 is required to be composed of a material which extends to be larger than an extension amount of the rotor diameter. Therefore, the seal fin 70 is composed of a material having a thermal expansion property larger than a material composing the turbine rotor 20.

That is, the material composing the seal fin 70 is composed of a material having excellent high-temperature strength, and having a linear expansion coefficient larger than a linear expansion coefficient of the material composing the turbine rotor 20.

From such a reason, the seal fin 70 is composed of austenitic stainless steel such as SUS 304. Further, the linear expansion coefficient of the material composing the seal fin 70 is preferably 1.1 times to 1.6 times as large as the linear expansion coefficient of the material composing the turbine rotor 20. The material composing the seal fin 70 has the above linear expansion coefficient, and thereby the clearances 83 between the seal fin divided structures 80, 81, 82 are almost eliminated at the time of operation of the steam turbine 1. That is, the clearances 83 become almost zero at the time of operation of the steam turbine.

Note that when the linear expansion coefficient of the material composing the seal fin 70 is less than 1.1 times as large as the linear expansion coefficient of the material composing the turbine rotor 20, the clearances 83 between the seal fin divided structures 80, 81, 82 remain, and steam leaks at the time of operation of the steam turbine 1. Further, when the linear expansion coefficient of the material composing the seal fin 70 is more than 1.6 times as large as the linear expansion coefficient of the material composing the turbine rotor 20, the extension in the circumferential direction is excessive, so that buckling by bringing the seal fin divided structures 80, 81, 82 adjacent in the circumferential direction into contact with each other can cause the seal fin divided structures 80, 81, 82 to drop. Further, an excessive thermal stress is produced by bringing the seal fin divided structures 80, 81, 82 adjacent in the circumferential direction into contact with each other, which can damage the seal fin divided structures 80, 81, 82.

The fixing member 90 has a role of fixing the seal fin 70 in the fixing groove 60 to prevent the seal fin 70 from dropping also during the operation of the steam turbine 1 by being driven into the fixing groove 60 to be plastic deformed. Thus, the fixing member 90 can increase a pressing force with respect to the fixing groove 60, and, as a result, is composed of a material with which a frictional force improves. That is, the fixing member 90 is composed of a material having a linear expansion coefficient larger than the linear expansion coefficient of the material composing the turbine rotor 20.

Specifically, the fixing member 90 is composed of austenitic stainless steel such as SUS 304 or pure nickel such as JIS NW2201. The linear expansion coefficient of the material composing the fixing member 90 is preferably 1.1 times to 1.7 times as large as the linear expansion coefficient of the material composing the turbine rotor 20. The material composing the fixing member 90 has the above linear expansion coefficient, and thereby the seal fin 70 is prevented from dropping at the time of operation of the steam turbine 1.

Note that when the linear expansion coefficient of the material composing the fixing member 90 is less than 1.1 times as large as the linear expansion coefficient of the material composing the turbine rotor 20, proper pressing force and frictional force with respect to the fixing groove 60 cannot be obtained, which can drop the fixing member 90. Further, when the linear expansion coefficient of the material composing the fixing member 90 is more than 1.7 times as large as the linear expansion coefficient of the material composing the turbine rotor 20, an extension in the circumferential direction is excessive, so that the fixing member 90 can drop by buckling by bringing the fixing members 90, into which it is divided, adjacent in the circumferential direction into contact with each other.

Note that for the material composing the fixing member 90, a material having a linear expansion coefficient equal to the linear expansion coefficient of the material composing the seal fin 70 or larger than that thereof is preferably used.

As described above, according to the turbine rotor 20 of the first embodiment, the configuration is made to include the seal fin 70 constituted of the first seal fin divided structure 80, the second seal fin divided structure 81, and the third seal fin divided structure 82, in which it is divided into three over the circumferential direction, and such that the length in the circumferential direction of the third seal fin divided structure 82 which is fixed in the fixing groove 60 last is the shortest.

Fixing the third seal fin divided structure 82 having the shortest length in the circumferential direction last facilitates incorporation work of the third seal fin divided structure 82 into the fixing groove 60, and also facilitates adjustment work of the length in the circumferential direction of the third seal fin divided structure 82. Further, the third seal fin divided structure 82 can be properly fixed with the clearances 83 with the predetermined width maintained between the third seal fin divided structure 82 and the first seal fin divided structure 80 which has already been fixed and between the third seal fin divided structure 82 and the second seal fin divided structure 81 which has already been fixed.

Further, the twist and the undulation to be produced on a surface of the fin portion 72 are suppressed in incorporating the first seal fin divided structure 80 in the fixing groove 60 by setting the division angle $\alpha1$ in the first seal fin divided structure 80 having the longest length in the circumferential direction in the previously described range.

Including the above seal fin 70 configuration allows the seal fin 70 to be easily mounted in the turbine rotor 20 when the seal fin 70 is fixed in a new product and also when the seal fin 70 is replaced by repair.

The clearances 83 between the seal fin divided structures 80, 81, 82 become almost zero at the time of operation of the steam turbine 1 by setting the linear expansion coefficient of the material composing the seal fin 70 in the previously described range. Thus, an amount of leaking steam can be suppressed to improve turbine efficiency.

Further, the dropping of the seal fin 70 at the time of operation of the steam turbine 1 is prevented by setting the linear expansion coefficient of the material composing the fixing member 90 in the previously described range.

Second Embodiment

Figure 4:
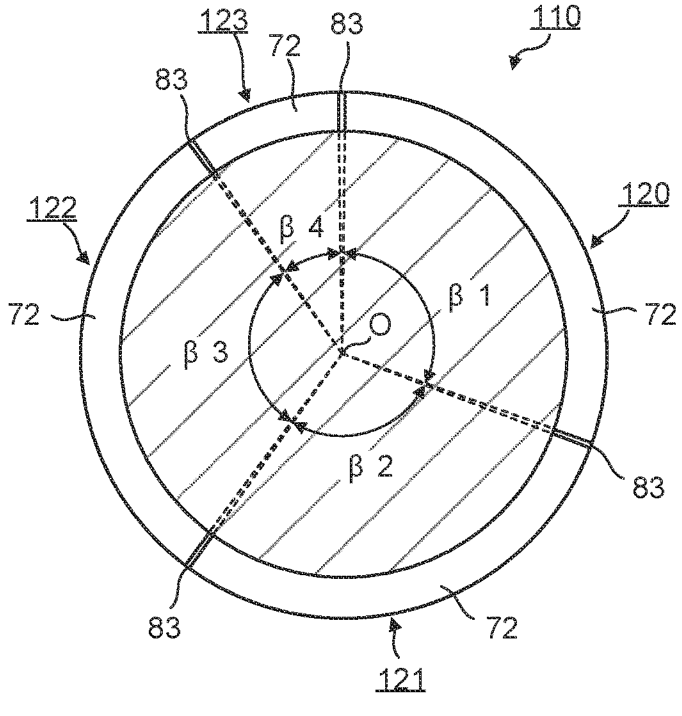
FIG. 4 is a view schematically illustrating a seal fin of a turbine rotor of a second embodiment in a cross section corresponding to the A-A cross section illustrated in FIG. 2.

FIG. 4 is a view schematically illustrating a seal fin 110 of a turbine rotor 20 of a second embodiment in a cross section corresponding to the A-A cross section illustrated in FIG. 2. Note that in the following embodiment, the same component parts as those of the turbine rotor 20 of the first embodiment are denoted by the same reference signs, and overlapping descriptions are omitted or simplified.

The turbine rotor 20 of the second embodiment includes the seal fin 110 divided into four over a circumferential direction. The other configuration is the same as the configuration of the turbine rotor 20 of the first embodiment. Thus, here, the configuration of the seal fin 110 different from the configuration of the seal fin 70 of the first embodiment will be mainly explained.

As illustrated in FIG. 4, the seal fin 110 is constituted of a first seal fin divided structure 120, a second seal fin divided structure 121, a third seal fin divided structure 122, and a fourth seal fin divided structure 123, in which it is divided into four over the circumferential direction.

Here, each of the first seal fin divided structure 120, the second seal fin divided structure 121, the third seal fin divided structure 122, and the fourth seal fin divided structure 123 has an L-shaped cross section, and has a base portion 71 and a fin portion 72 similarly to the seal fin 70 of the first embodiment. Further, each of the seal fin divided structures 120, 121, 122, 123 is curved in an arc shape in a longitudinal direction (circumferential direction).

The seal fin 110 in a ring shape is constituted as a whole by disposing the seal fin divided structures 120, 121, 122, 123 in the circumferential direction in a fixing groove 60. Note that clearances 83 between the seal fin divided structures 120, 121, 122, 123 are similar to the clearances 83 explained in the first embodiment.

A length in the circumferential direction (longitudinal direction) of the fourth seal fin divided structure 123 is shorter than lengths in the circumferential direction of the first seal fin divided structure 120, the second seal fin divided structure 121, and the third seal fin divided structure 122. That is, the length in the circumferential direction of the fourth seal fin divided structure 123 is the shortest of those of the seal fin divided structures 120, 121, 122, 123.

Further, the fourth seal fin divided structure 123 is fixed in the fixing groove 60 last. In other words, the length in the circumferential direction of the fourth seal fin divided structure 123 which is fixed last is configured to be the shortest.

Further, here, a case where the lengths in the circumferential direction of the first seal fin divided structure 120, the second seal fin divided structure 121, and the third seal fin divided structure 122 are equal is exemplified. Note that the lengths in the circumferential direction of the first seal fin divided structure 120, the second seal fin divided structure 121, and the third seal fin divided structure 122 may be different from each other, or any two of them may be equal.

Here, when the lengths in the circumferential direction of the first seal fin divided structure 120, the second seal fin divided structure 121, and the third seal fin divided structure 122 are different from each other, a division angle centered on a center axis O in the seal fin divided structure having the longest length in the circumferential direction is set to 180 degrees or less in a cross section perpendicular to the center axis O of the turbine rotor 20 illustrated in FIG. 4. A twist and an undulation to be produced on a surface of the fin portion 72 are suppressed in incorporating the longest seal fin divided structure in the fixing groove 60 by setting the division angle to 180 degrees or less.

Note that in the seal fin 110 exemplified in FIG. 4, a division angle $\beta1$ in the first seal fin divided structure 120, a division angle $\beta2$ in the second seal fin divided structure 121, and a division angle $\beta3$ in the third seal fin divided structure 122 are configured to be equal.

The length in the circumferential direction of the fourth seal fin divided structure 123 having the shortest length in the circumferential direction is set to not less than 30 mm nor more than 200 mm. Further, the length in the circumferential direction of the fourth seal fin divided structure 123 is more preferably set to not less than 50 mm nor more than 150 mm.

When the length in the circumferential direction of the fourth seal fin divided structure 123 is less than 30 mm, in caulking a fixing member 90 for fixing the fourth seal fin divided structure 123, the fourth seal fin divided structure 123 comes close to the first seal fin divided structure 120 and the third seal fin divided structure 122 which have already been fixed, so that the fixing member 90 fixing the first seal fin divided structure 120 and the third seal fin divided structure 122 is also caulked at the same time. This causes the clearances 83 between the fourth seal fin divided structure 123 and the first seal fin divided structure 120 adjacent thereto and between the fourth seal fin divided structure 123 and the third seal fin divided structure 122 adjacent thereto to become narrow.

Further, when the length in the circumferential direction of the fourth seal fin divided structure 123 is less than 30 mm, a proper grip allowance for fixing it to a jig (section where it is fixed to the jig) cannot be obtained in performing processing for adjusting the length of the fourth seal fin divided structure 123.

Here, in caulking the fixing member 90, the seal fin 110 extends in the circumferential direction, but an extension thereof is difficult to accurately calculate by calculation. Further, the longer the length in the circumferential direction of the seal fin 110 is, the more difficult the calculation of the extension is. When the length in the circumferential direction of the fourth seal fin divided structure 123 exceeds 200 mm, an extension in the circumferential direction of the fourth seal fin divided structure 123 also increases in caulking the fixing member 90. Therefore, in fixing the fourth seal fin divided structure 123 with the length exceeding 200 mm, an extension length in the circumferential direction cannot be accurately estimated, so that the clearances 83 with a predetermined width between the fourth seal fin divided structure 123 and the first seal fin divided structure 120 which has already been fixed and between the fourth seal fin divided structure 123 and the third seal fin divided structure 122 which has already been fixed are difficult to maintain.

For example, in fixing the fourth seal fin divided structure 123 whose length in the circumferential direction exceeds 200 mm, an end portion of the fourth seal fin divided structure 123 may overlap with the first seal fin divided structure 120 or the third seal fin divided structure 122 which has already been fixed. In such a case, length adjustment processing of the end portion of the fourth seal fin divided structure 123 is performed in a state in the course of fixing work, or the fourth seal fin divided structure 123 is removed and the length adjustment processing of the end portion is performed. A complicated processing process is required in either of the processes.

Here, the above range of the length in the circumferential direction in the fourth seal fin divided structure 123 is appropriately set based on a rotor diameter of the turbine rotor 20. For example, when the turbine rotor 20 has a large rotor diameter, the length in the circumferential direction of the fourth seal fin divided structure 123 can be set to be long. On the other hand, when the turbine rotor 20 has a small rotor diameter, the length in the circumferential direction of the fourth seal fin divided structure 123 is set to be short.

For example, the fourth seal fin divided structure 123 having the maximum length (200 mm) in the circumferential direction is used for the turbine rotor 20 having a rotor diameter such that the division angle β4 regarding the fourth seal fin divided structure 123 illustrated in FIG. 4 is 50 degrees or less.

Here, a fixing method of the seal fin 110 is similar to the fixing method of the seal fin 70 of the first embodiment.

The fixation of the fourth seal fin divided structure 123 is performed last in the fixation of the seal fin 110, and any of the seal fin divided structures 120, 121, 122 except for it may be fixed first.

Further, a material composing the seal fin 110 is the same as the material composing the seal fin 70 of the first embodiment.

As described above, according to the turbine rotor 20 of the second embodiment, the configuration is made to include the seal fin 110 constituted of the first seal fin divided structure 120, the second seal fin divided structure 121, the third seal fin divided structure 122, and the fourth seal fin divided structure 123, in which it is divided into four over the circumferential direction, and such that the length in the circumferential direction of the fourth seal fin divided structure 123 which is fixed in the fixing groove 60 last is the shortest.

Fixing the fourth seal fin divided structure 123 having the shortest length in the circumferential direction last facilitates incorporation work of the fourth seal fin divided structure 123 into the fixing groove 60, and also facilitates adjustment work of the length in the circumferential direction of the fourth seal fin divided structure 123. Further, the fourth seal fin divided structure 123 can be properly fixed with the clearances 83 with the predetermined width maintained between the fourth seal fin divided structure 123 and the first seal fin divided structure 120 which has already been fixed and between the fourth seal fin divided structure 123 and the third seal fin divided structure 122 which has already been fixed.

Further, the other operation and effect in the turbine rotor 20 of the second embodiment is also similar to the operation and effect in the turbine rotor 20 of the first embodiment.

OTHER EMBODIMENTS

There is shown one example in which in the seal parts 50 and the gland seal parts 100 in the above embodiments, the inner peripheral surfaces of the diaphragm inner ring 42 and the casing 10 which face the seal fins 70 provided in the turbine rotor 20 are constituted by a curved surface having no protrusion and recess over the circumferential direction, as illustrated in FIG. 1. Here, seal parts 50 and gland seal parts 100 including the other configurations will be explained.

Figure 5:
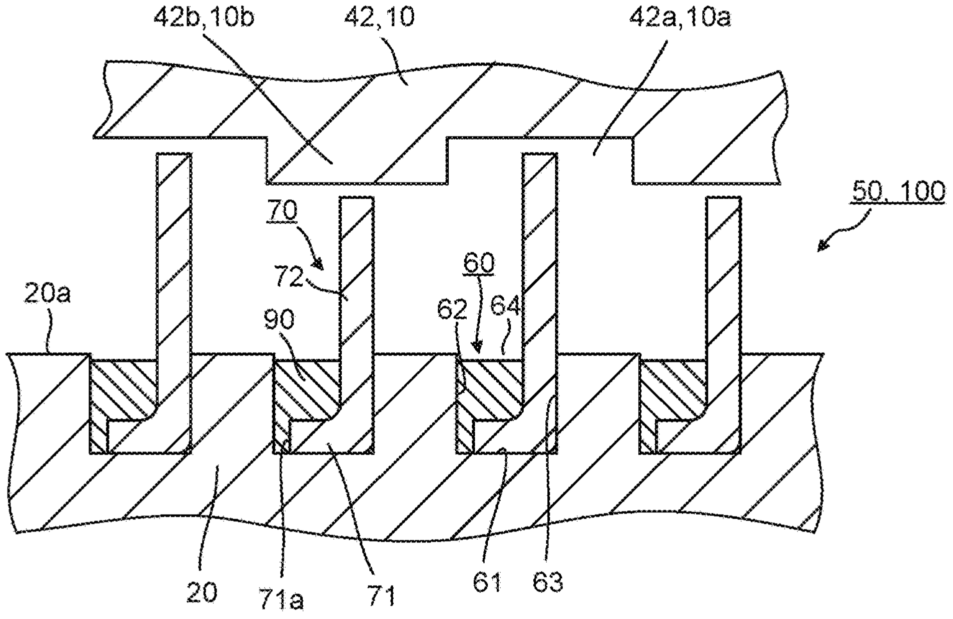
FIG. 5 is a view enlarging and illustrating a seal part and a gland seal part in another embodiment in a cross section corresponding to the cross section illustrated in FIG. 1.

FIG. 5 is a view enlarging and illustrating the seal part 50 and the gland seal part 100 in another embodiment in a cross section corresponding to the cross section illustrated in FIG. 1.

As illustrated in FIG. 5, seal fins 70 may be constituted by a so-called High-Low type of seal fins in which a fin portion 72 having a long length in a radial direction and a fin portion 72 having a short length in the radial direction are provided alternately in an axial direction. Note that the seal fins 70 include the configurations as explained in the first and second embodiments except to be the High-Low type of seal fins. That is, the turbine rotor 20 of the other embodiment illustrated in FIG. 5 includes the same configurations as those of the turbine rotors 20 explained in the first and second embodiments except to include the High-Low type of the seal fins 70.

In the seal part 50 including such a High-Low type of the seal fins 70, the inner peripheral surface of the diaphragm inner ring 42 has a protruding and recessed shape in the axial direction as illustrated in FIG. 5. Specifically, a recessed groove 42*a* in an annular shape is formed over the circumferential direction in the inner peripheral surface of the diaphragm inner ring 42 facing the fin portion 72 having a long length in the radial direction. On the other hand, a ridge portion 42*b* in an annular shape is formed over the circumferential direction in the inner peripheral surface of the diaphragm inner ring 42 facing the fin portion 72 having a short length in the radial direction.

Further, in the gland seal part 100 including the High-Low type of the seal fins 70, the inner peripheral surface of the casing 10 has a protruding and recessed shape in the axial direction as illustrated in FIG. 5. Specifically, a recessed groove 10*a* in an annular shape is formed over the circumferential direction in the inner peripheral surface of the casing 10 facing the fin portion 72 having a long length in the radial direction. On the other hand, a ridge portion 10*b* in an annular shape is formed over the circumferential direction in the inner peripheral surface of the casing 10 facing the fin portion 72 having a short length in the radial direction.

Figure 6:
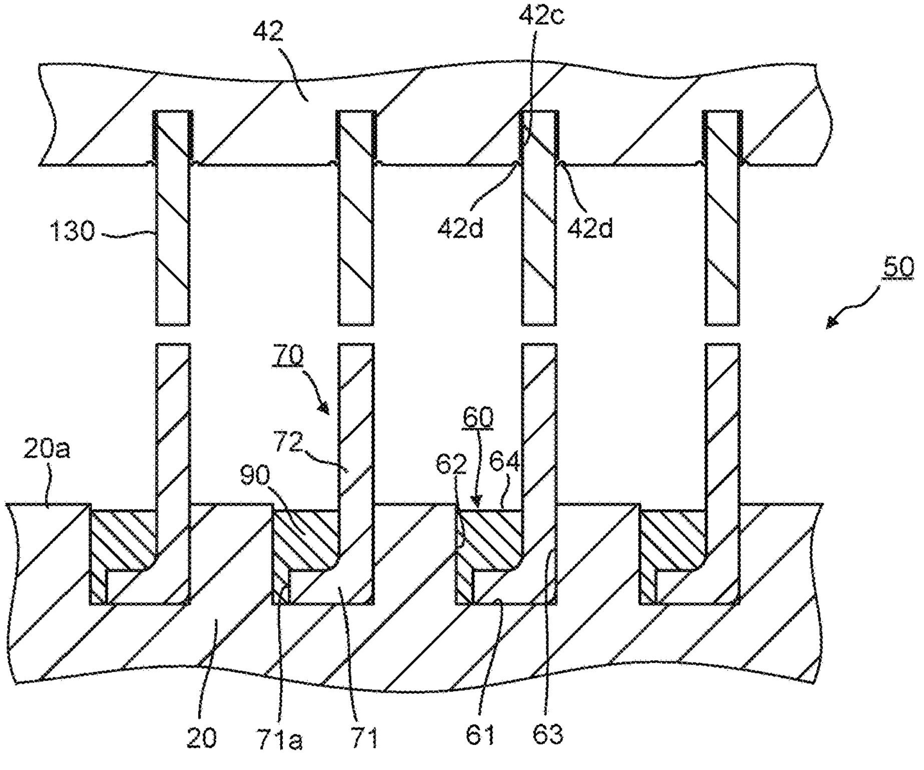
FIG. 6 is a view enlarging and illustrating a seal part and a gland seal part in another embodiment in a cross section corresponding to the cross section illustrated in FIG. 1.

FIG. 6 is a view enlarging and illustrating a seal part 50 in another embodiment in a cross section corresponding to the cross section illustrated in FIG. 1.

As illustrated in FIG. 6, the seal part 50 may include a seal fin 70 provided in a turbine rotor 20, and a seal fin 130 provided in an inner peripheral surface of a diaphragm inner ring 42 to face the seal fin 70. Note that a clearance with a predetermined width exists between the seal fin 70 and the seal fin 130 in a radial direction.

Note that here, one example in which the seal fin 70 and the seal fin 130 are disposed to face each other in the radial direction is shown, but this configuration is not restrictive. For example, the seal fin 130 may be disposed to displace an axial position with respect to the seal fin 70. In this case, the seal fin 130 is located between the seal fins 70 in the axial direction. Note that the seal fin 70 includes the configurations as explained in the first and second embodiments. That is, the turbine rotor 20 of the other embodiment illustrated in FIG. 6 includes the same configurations as those of the turbine rotors 20 explained in the first and second embodiments.

The seal fin 130 is a seal fin with a conventional implanted configuration. Here, there is shown a configuration in which the seal fin 130 is fixed by caulking in an annular groove 42*c* formed over a circumferential direction in the inner peripheral surface of the diaphragm inner ring 42, as one example. Note that a plurality of the annular grooves 42*c* are formed at predetermined intervals in the axial direction.

The seal fin 130 is fixed in the annular groove 42*c* by caulking the inner peripheral surface of the diaphragm inner ring 42 adjacent to an opening of the annular groove 42*c* to form a caulked portion 42*d*.

Note that here, the seal part 50 including the seal fin 130 in the inner peripheral surface of the diaphragm inner ring 42 as a seal part structure including the seal fin on a static structure side is exemplified to be explained, but this seal part structure is not restrictive.

Figure 7:
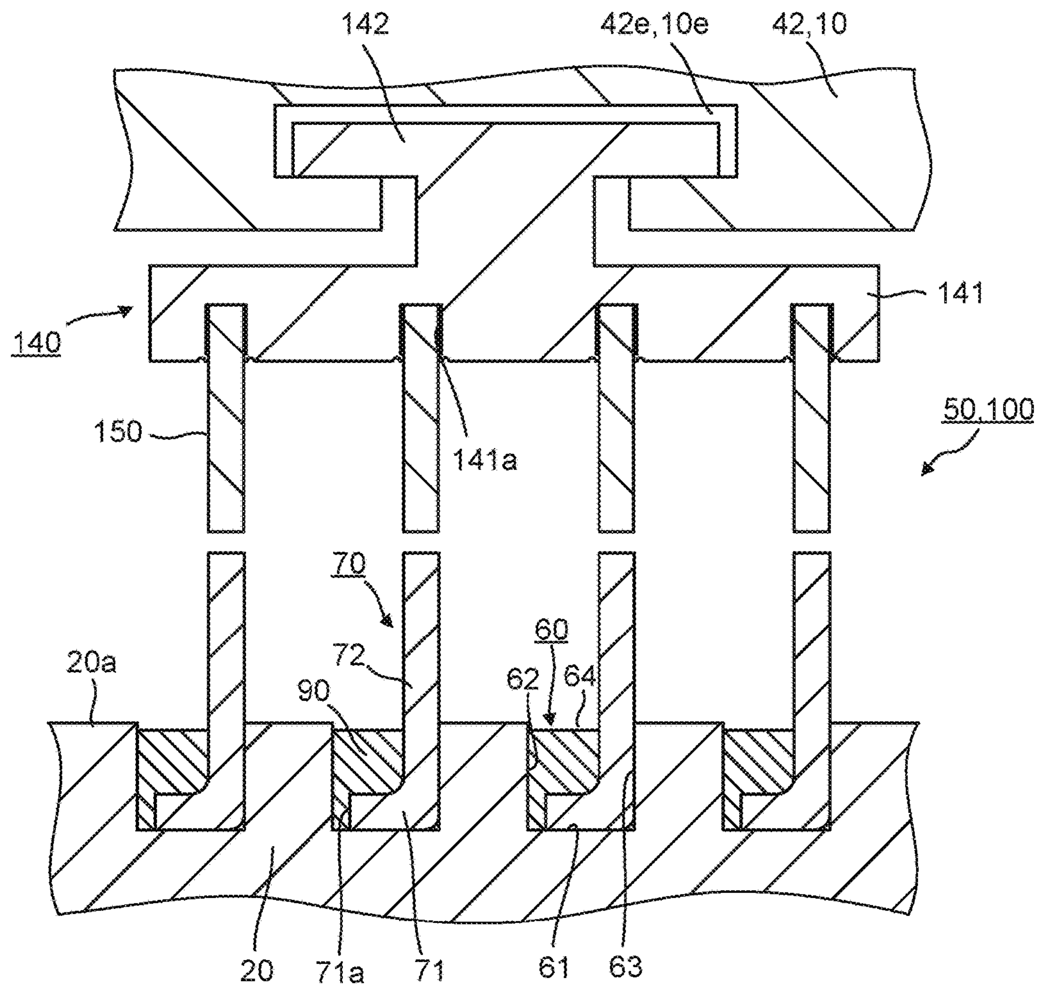
FIG. 7 is a view enlarging and illustrating a seal part and a gland seal part in the other embodiment in a cross section corresponding to the cross section illustrated in FIG. 1.

FIG. 7 is a view enlarging and illustrating a seal part 50 and a gland seal part 100 in the other embodiment in a cross section corresponding to the cross section illustrated in FIG. 1.

As illustrated in FIG. 7, the seal part 50 may include a seal fin 70 provided in a turbine rotor 20, a packing ring 140 provided in an inner peripheral surface of a diaphragm inner ring 42 to face the seal fin 70, and a seal fin 150 provided in the packing ring 140. Further, the gland seal part 100 may include the seal fin 70 provided in the turbine rotor 20, the packing ring 140 provided in an inner peripheral surface of a casing 10 to face the seal fin 70, and the seal fin 150 provided in the packing ring 140.

The packing ring 140 has an inner peripheral ring portion 141 in an annular shape, and an outer peripheral ring portion 142 provided on a radially outer side further than the inner peripheral ring portion 141.

The seal fin 150 is provided to face the seal fin 70 in an inner peripheral surface of the inner peripheral ring portion 141. Note that a clearance with a predetermined width exists between the seal fin 70 and the seal fin 150 in a radial direction. Here, there is shown a configuration in which the seal fin 150 is fixed by caulking in an annular groove 141*a* formed over a circumferential direction in the inner peripheral surface of the inner peripheral ring portion 141, as one example. Note that a plurality of the annular grooves 141*a* are formed at predetermined intervals in an axial direction.

Note that the seal fin 150 may be disposed to displace an axial position with respect to the seal fin 70. The seal fin 70 includes the configurations as explained in the first and second embodiments. That is, the turbine rotor 20 of the other embodiment illustrated in FIG. 7 includes the same configurations as those of the turbine rotors 20 explained in the first and second embodiments.

The outer peripheral ring portion 142 is engaged in hook fitting portions 42*e*, 10*e* in an annular shape formed over the circumferential direction in the inner peripheral surface of the diaphragm inner ring 42 and the inner peripheral surface of the casing 10. This causes the packing ring 140 to be statically supported by the diaphragm inner ring 42 and the casing 10.

Also in the turbine rotors 20 constituting the seal parts 50 and the gland seal parts 100 illustrated in FIG. 5 to FIG. 7, operation and effect similar to the operation and effect in the turbine rotors 20 of the first and second embodiments can be obtained.

According to the embodiments explained above, it becomes possible to facilitate the incorporation work of the seal fin and to properly provide the seal fin.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of fixing a seal fin to a fixing groove constituted by an annular groove formed over a circumferential direction in an outer peripheral surface of a turbine rotor:

wherein the seal fin is constituted by disposing a plurality of seal fin divided structures in the circumferential direction, each of the plurality of seal fin divided structures has a base portion disposed on a bottom surface of the fixing groove and extending in a groove width direction of the fixing groove, and a fin portion standing from one end side in the groove width direction of the base portion to an opening side of the fixing groove, and the plurality of seal fin divided structures include a shortest seal fin divided structure configured so that a length in the circumferential direction is the shortest seal fin divided structure of the plurality of seal fin divided structures; and the method of fixing the seal fin, comprising:

sequentially placing each of the plurality of seal fin divided structures other than the shortest seal fin divided structure in the fixing groove and fixing them with fixing members; and finally placing the shortest seal fin divided structure in the fixing groove and fixing it with a fixing member.

2. The method of fixing the seal fin according to claim 1, wherein the seal fin is constituted by disposing three of the plurality of seal fin divided structures in the circumferential direction.

3. The method of fixing the seal fin according to claim 1, wherein the seal fin is constituted by disposing four of the plurality of seal fin divided structures in the circumferential direction.

4. The method of fixing the seal fin according to claim 1, wherein the length in the circumferential direction of the shortest seal fin divided structure is not less than 30 mm nor more than 200 mm.

5. The method of fixing the seal fin according to claim 1, wherein in a cross section perpendicular to a center axis of the turbine rotor, a division angle centered on the center axis in the shortest seal fin divided structure configured so that a length in the circumferential direction is a longest of the plurality of seal fin divided structures is 180 degrees or less.

* * * * *